(12) United States Patent
Darby

(10) Patent No.: US 10,960,825 B1
(45) Date of Patent: Mar. 30, 2021

(54) FISHING ROD HOLDER FOR COVERED CARGO BED

(71) Applicant: Gerald Darby, Harmony, FL (US)

(72) Inventor: Gerald Darby, Harmony, FL (US)

( * ) Notice: Subject to any disclaimer, the term of this patent is extended or adjusted under 35 U.S.C. 154(b) by 0 days.

(21) Appl. No.: 16/714,893

(22) Filed: Dec. 16, 2019

(51) Int. Cl.
*B60R 9/08* (2006.01)
*B60R 11/00* (2006.01)

(52) U.S. Cl.
CPC ......... *B60R 9/08* (2013.01); *B60R 2011/0066* (2013.01)

(58) Field of Classification Search
CPC ...... B60R 9/08; B60R 2011/066; A01K 97/10
USPC ................... 224/922; 43/21.2; D3/147, 148; D22/147
See application file for complete search history.

(56) References Cited

U.S. PATENT DOCUMENTS

| | | | | |
|---|---|---|---|---|
| 2,907,506 A | * | 10/1959 | Sammons | B60R 9/08 224/317 |
| 3,155,299 A | * | 11/1964 | Horne | B60R 5/006 224/311 |
| 5,544,797 A | * | 8/1996 | Silva | B60R 7/005 224/311 |
| D446,280 S | * | 8/2001 | Marriott | D22/147 |
| 6,321,482 B1 | * | 11/2001 | Boyd | A01K 97/10 43/21.2 |
| 6,739,084 B1 | * | 5/2004 | Hansen | A01K 97/08 43/21.2 |
| 8,875,963 B2 | * | 11/2014 | Knutson | A01K 97/08 224/405 |
| 9,862,328 B2 | * | 1/2018 | Smith | B60R 7/08 |
| 10,058,085 B2 | * | 8/2018 | Harris | A01K 97/10 |
| 10,077,579 B2 | * | 9/2018 | Brown | A01K 97/08 |
| 10,798,930 B1 | * | 10/2020 | Rodriguez | A01K 97/10 |
| 2006/0237501 A1 | * | 10/2006 | Gonzalez | A01K 97/08 224/325 |
| 2018/0110210 A1 | * | 4/2018 | Placko | B60R 9/08 |

* cited by examiner

Primary Examiner — Justin M Larson

(57) ABSTRACT

A device for transporting and storing fishing rods in a covered pickup truck cargo bed with easy loading or unloading through the tailgate of the truck without removing a cargo bed cover. This reduces entanglement and potential damage of rods, frees up the lower cargo bed for other materials, keeps rods more securely out of sight and out of the weather. Rods are suspended at the upper region of the cargo bed allowing for smaller cargo to be loaded on the floor of the cargo bed beneath the hanging rods without removal of the rod holder either loaded or empty.

6 Claims, 4 Drawing Sheets

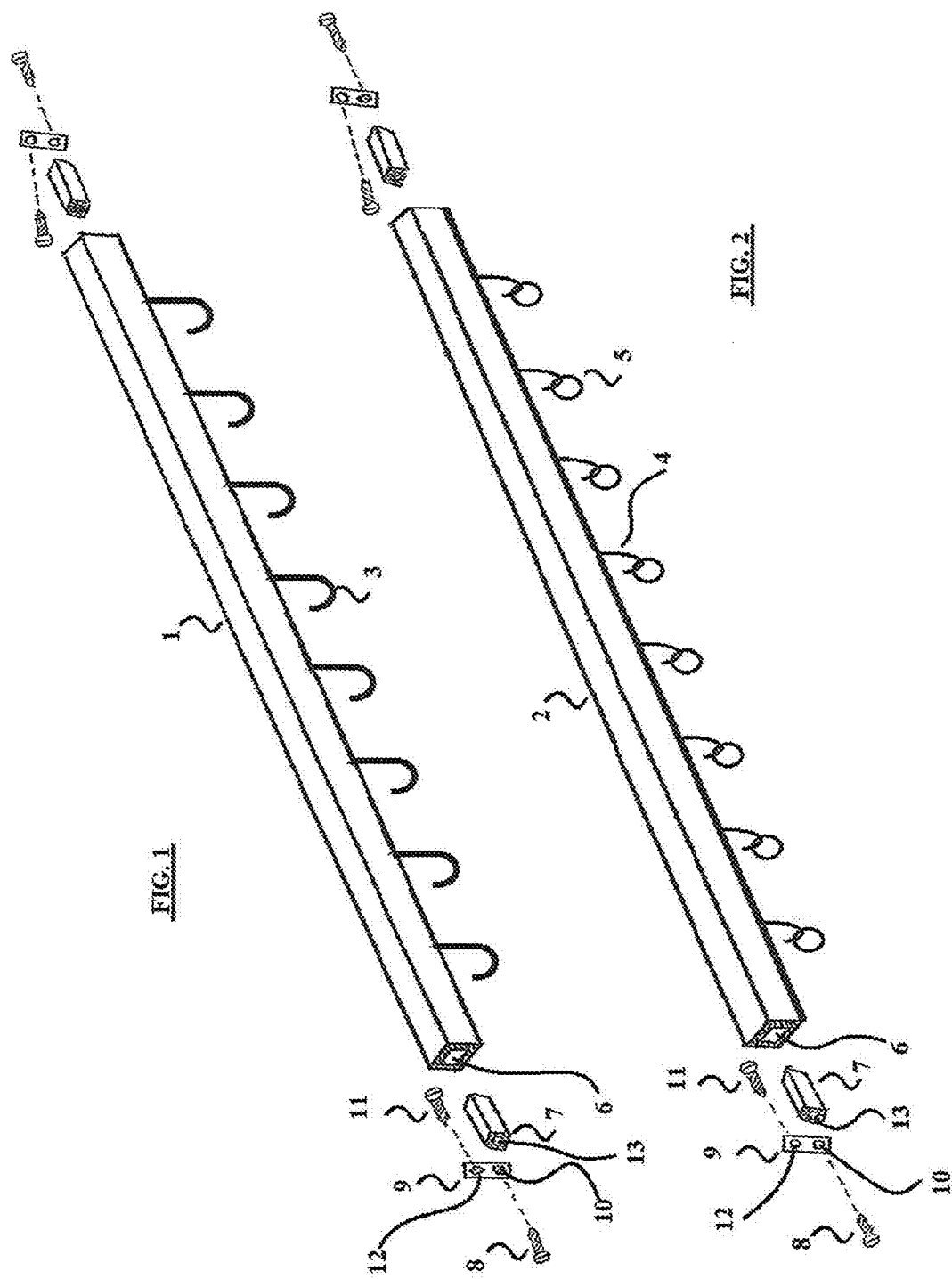

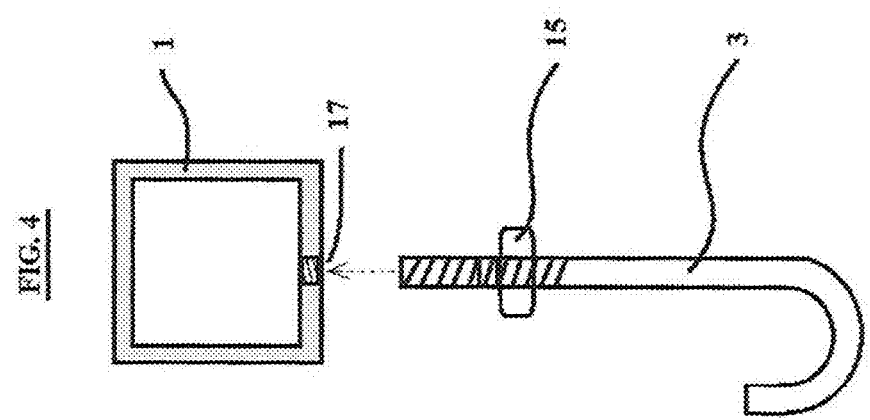
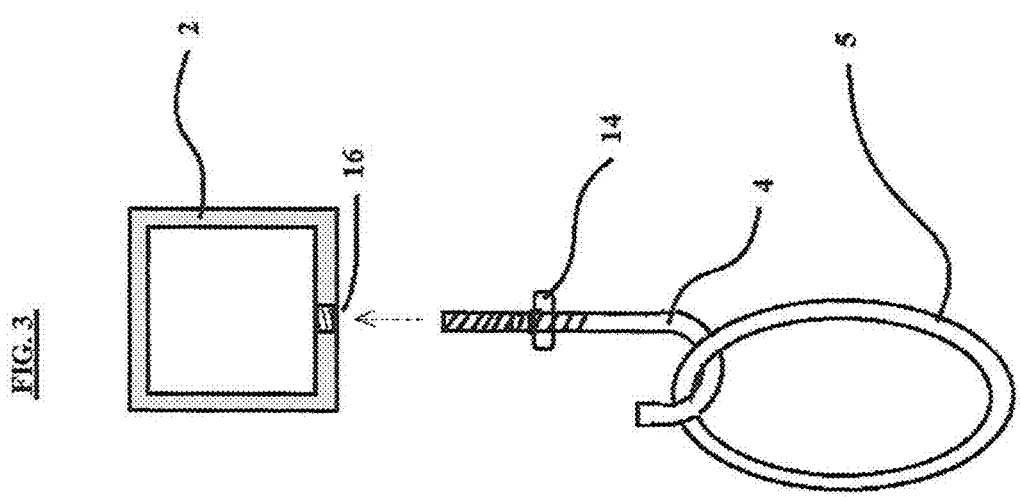

FISHING ROD HOLDER FOR COVERED CARGO BED

FIELD

This application relates to a horizontal fishing rod holder for rods to be held by rails mounted at the uppermost sides of a pickup cargo bed.

BACKGROUND

Travelling with fishing rods in a pickup truck is accomplished using a variety of devices but many allow the rods and reels to be visible to the public, exposed to the weather and at risk of theft when the vehicle is unattended. Vertical rod holders hold the handle of the rod and the rod in a near vertical position in a conical device and may need to be removed if the cargo bed is used to transport other items. Existing horizontal rod holders in my review are not as easily loaded and unloaded and require open beds or rearrangement of a bed cover if present. Laying rods in the cargo bed of the pickup truck subjects them to damage or entanglement.

This horizontal fishing rod holder can be used on a pickup truck with a cargo bed cover in place, a cover such as a Tonneau, other types of flat covers, hard cover or foldable bed covers. Rods using this device may be loaded or unloaded through the lowered tailgate without removing or adjusting the cover or the holder, leaving space below the rods to bed load other materials.

Many different or commonly sized fishing rods can be accommodated in this rod holder.

U.S. Pat. No. 8,746,469 B1 to De La Torre appears to intend similar horizontal transport with a more complicated loading and removal of rods, leaving limited room in the bed of the vehicle for adding cargo when the device is installed in the vehicle.

SUMMARY

This device comprises a forward and rear rail to hold the rods in place by gravity, wherein rails are affixed to the side rails of the pickup at the top inside edge of the cargo bed. This rod holder allows for the easy loading and unloading of rods through the tailgate, without the need for opening or moving the cargo bed covers. Rods are suspended at the upper region of the cargo bed allowing for other cargo to be loaded in the cargo bed without removal of loaded rods and rod holder.

Multiple rods are held by the device and the specific rods selected for use that day may be easily and individually removed by the user.

Multiple lengths and configurations of j-bolts can be used to accommodate the length of rods for the length of each cargo bed. Rods shorter than the cargo bed may be stored parallel to the length of the pickup or positioned at an angle when using a rod that is longer than the cargo bed.

Rods are held off the cargo bed floor so other cargo may be loaded without interfering with the rods. The rods may remain, loaded in the cargo bed for storage, where they will remain out of sight and out of the weather.

BRIEF DESCRIPTION OF DRAWINGS

In the following detailed portion of the presented description, the rod holder will be explained in more detail with reference to the drawings in which:

FIG. 1 is a view the forward support rail and j-bolts

FIG. 2 is a view of the rear support rail, j-bolts and rings

FIG. 3 is an end view of the rear support rail, j-bolts and rings

FIG. 4 is an end view of the forward support rail and j-bolts

DETAILED DESCRIPTION OF THE ROD HOLDER AND FIGURES

Figure 5:
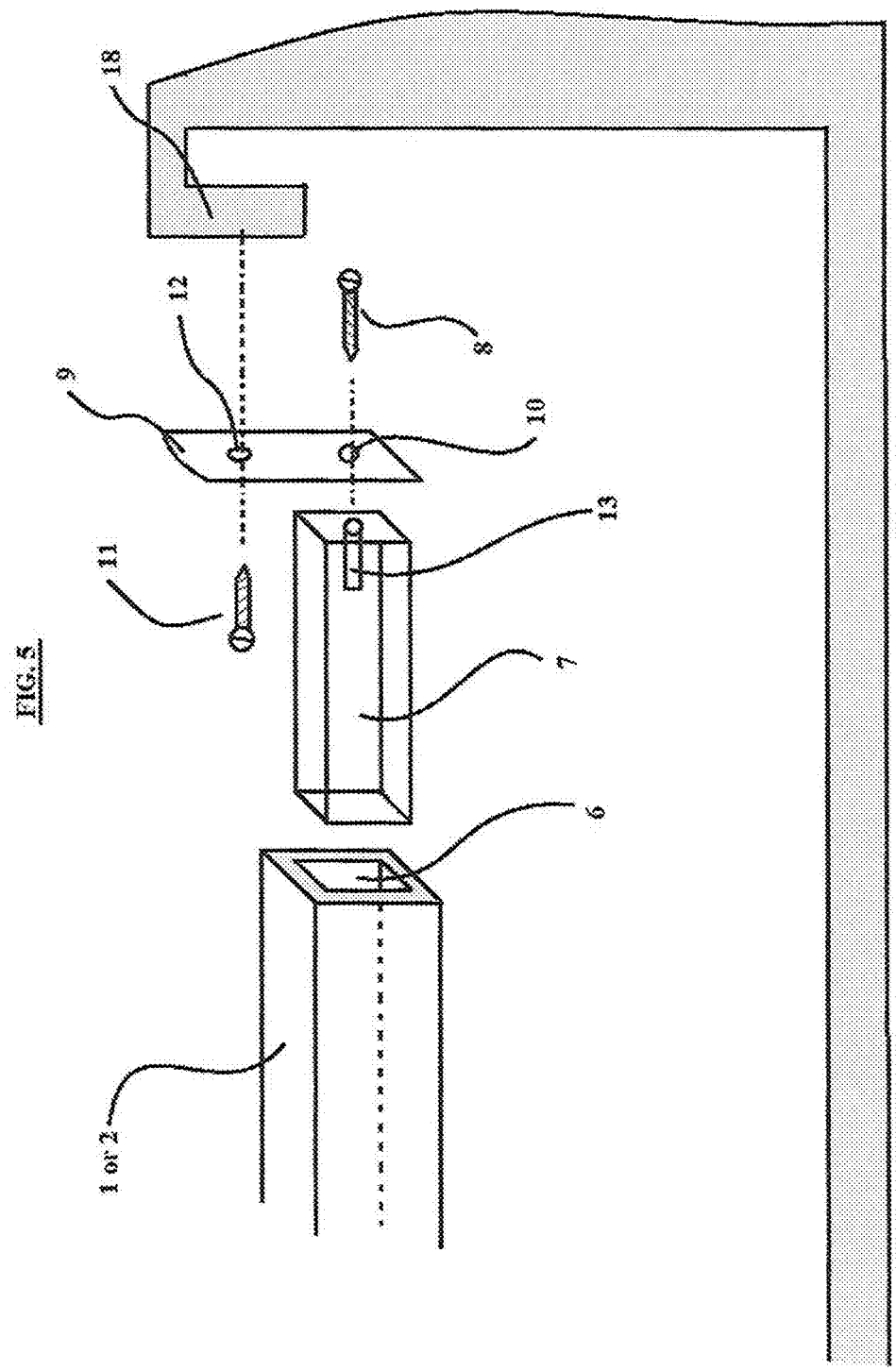
FIG. 5 is a side view of fastening method for each support rail end

In the following detailed description, the figures will be used to describe the use of the Fishing Rod Holder for Covered Cargo Beds. The reference numbers in each figure represent identical parts throughout the figures.

The device will accommodate most lengths of rods or other pole type equipment in cargo beds which vary in bed length from 4 to 8 feet. Rods shorter than the length of the cargo bed can be loaded parallel to the cargo bed. Rods a foot longer than a particular cargo bed can generally be loaded at an angle to rack a longer rod. Rods much longer than the length of the cargo bed can be split into two pieces at the ferrule and racked, for example a twelve-foot rod separated into two pieces for a six-foot cargo bed.

Rod holding devices for pickup trucks are typically mounted to hold the rod in a vertical or slightly angled position with the handle inserted in a conical tube to hold it in place in conjunction with other holder and stabilizing components. Loaded in this manner, the rods are exposed to weather, wind and visible to the public at risk of theft.

This invention allows quick and easy loading and unloading by lowering the tailgate without adjusting or retracting the truck cargo bed cover. Rods are suspended by j-bolts and supporting rings mounted to one of two horizontal rails which are affixed to each side of the cargo bed.

The rods and reels are positioned just under the cover leaving the floor of the cargo bed available for loading materials without having to remove the rods. Rods can remain in place in the cargo bed, remaining in place by force of gravity.

The advantage of this invention is to easily load and unload rods without removing truck bed coverings on the cargo bed, to store rods as long as desired and to secure them out of sight.

The invention comprises a square tube forward rail and a square tube rear rail mounted to the sides of the cargo bed of the truck for support of the fishing rods. In the following described embodiment, the components are made of aluminum and steel however any material could be used.

FIG. 1 depicts the forward rail which is a square tube 1 the approximate the width of the cargo bed. J-bolts 3, are mounted on the bottom side of the square tube 1 to hang the shaft/blank of the fishing rod or other poles.

FIG. 2 depicts the rear rail which is a square tube 2 the approximate the width of the cargo bed. J-bolts 4, are mounted on the bottom side of the square tube 2 to hang a round metal ring 5 which holds the handle of the fishing rod. The handle of the fishing rod is placed through ring 5 wherein metal ring 5 with pole handle inserted through it, is hooked over the j-bolt 4 to hold the rods on the rear rail 2.

FIG. 3 shows the end view of the rear square tube rail 2 wherein the drilled and tapped hole 16 is located in the bottom of the square tube 2 for holding j-bolt 4. J-bolt 4 is threaded into the tapped hole 16 which is secured in the desired position by nut 14. The rod handle is inserted through metal ring 5 and ring 5 is hung on j-bolt 4 with rod handle inserted. This embodiment shows a tapped hole to secure j-bolt 4 to square tube 2 but could employ other fastening methods in alternate embodiments. This embodiment has eight tapped holes, at even intervals over the length of the square tube, but other embodiments can have more or fewer j-bolts and rings.

FIG. 4 shows the end view of the forward square tube rail 1, wherein the drilled and tapped hole 17 is located in the bottom of square tube 1 for holding j-bolt 3. J-bolt 3 is threaded into the tapped hole 17 which is secured in the desired position by nut 15. This embodiment shows a tapped hole to secure j-bolt 3 to square tube 1 but could employ other fastening methods in alternate embodiments. The j-bolt 3 can in another embodiment be coated with a plasticized material to protect the fishing rods. This embodiment shows a tapped hole to secure j-bolt 3 to square tube 1 and could employ other fastening methods in alternate embodiments. This embodiment has eight tapped holes, at even intervals but other embodiments can have more or fewer j-bolts.

FIG. 5 shows the adjustment and mounting assembly for the ends of square tube rails 1 or 2. In this embodiment, both the forward rail 1 and the rear rail 2 are attached to the upper inside edge of the cargo bed 18 using the components shown in FIG. 5, at each end of each square tube to adjust to variable truck body widths. The mounting configuration on each end of each rail is identical, to allow some adjustment for small variances in cargo bed width. Wherein this adjustment is available in this embodiment on both ends of the rails, a separate embodiment may have a single adjustable end and a solid anchor on the opposite end. Square solid bar 7 slides into square tube rail 1 or 2 of the square tube at square tube end hole 6. Square solid bar 7 has a hole 13 drilled into one end. Screw 8 secures mending plate 9 through hole 10 in the mending plate into hole 13 in the square solid bar to secure mending plate 9 to square solid bar 7. Screw 11 secures mending plate 9 through hole 12 in the mending plate, into the top inside edge 18 of the truck cargo bed.

Figure 6:
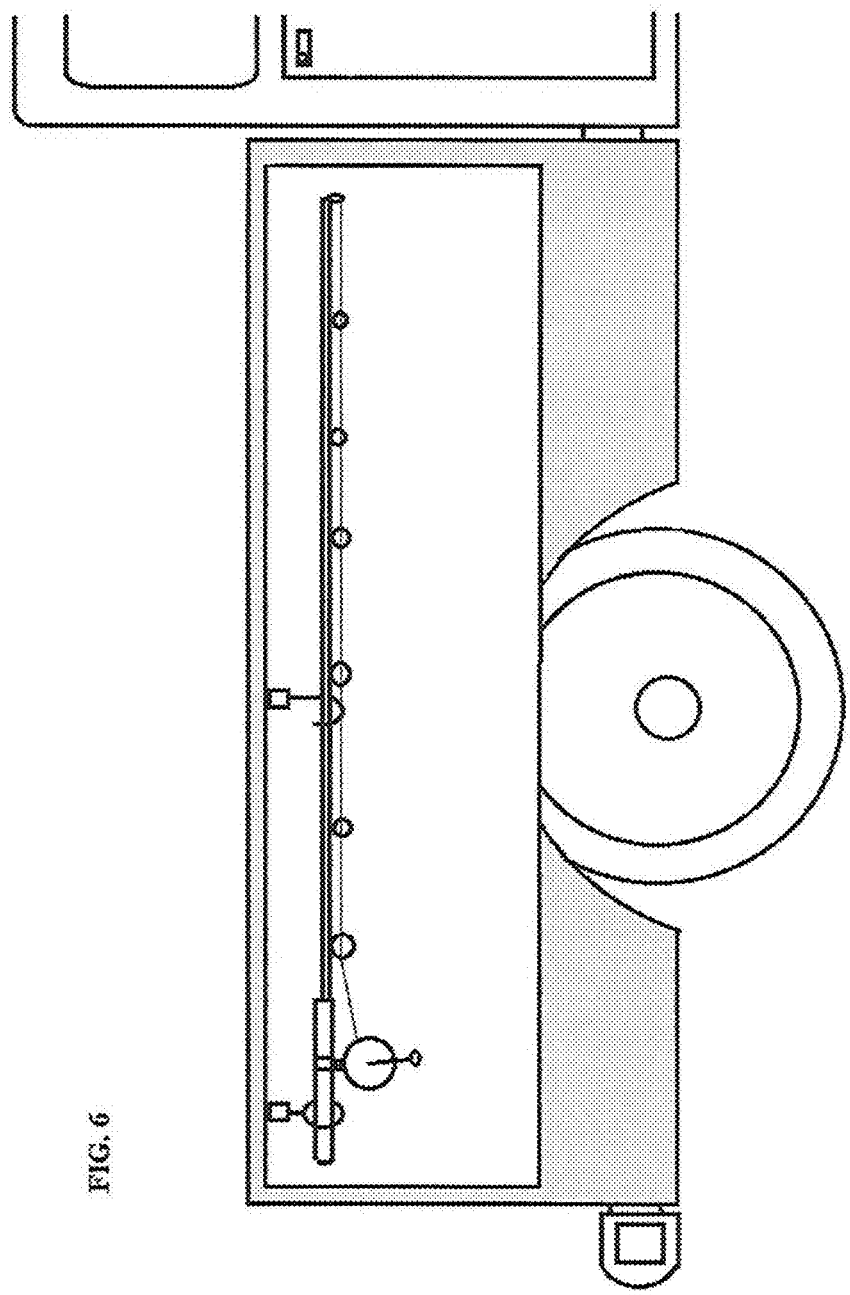
FIG. 6 is side view of the device installed in the truck cargo bed, holding a fishing rod

FIG. 6 shows a side view of a pickup truck with the rod holding device mounted and holding a fishing rod as it would be loaded in the fishing rod holder.

I claim as my invention:

1. A device for holding fishing rods or other small diameter elongated equipment under a covered cargo bed comprising:
    a forward supporting rail having j-bolts attached to the bottom side of said forward supporting rail for supporting fishing rods;
    a rear supporting rail having j-bolts attached to the bottom side of said rear supporting rail with metal rings to hang from the j-bolts of said rear supporting rail for supporting fishing rods; and
    an end adjustment and mount for said forward and rear supporting rails to attach each end of said forward and rear supporting rails to the top inside edge of the pickup truck cargo bed to secure the fishing rod supporting rails in place.

2. A device according to claim 1, wherein said forward supporting rail j-bolt will support the body of the rods known as the blank or rod at a midpoint.

3. A device according to claim 1, wherein said rear supporting rail and attached j-bolts will support the handle of the rod with said rod handle inserted through a metal ring and with said metal ring hung on the j-bolt.

4. A device according to claim 1, wherein supporting rails are formed of a square tube material.

5. A device according to claim 1, wherein there is an end adjustment and mounting component of said forward and rear supporting rails to attach each end of the forward and rear supporting rails to the top inside edge of the pickup truck cargo bed, said adjustment and mounting component comprising;
    a solid square bar of sufficient dimension to allow said solid square bar to slide inside the end of the hollow square tubes to mount the rails to the side of the vehicle;
    a mending plate and screws wherein one end of said mending plate is secured to the solid square bar and the opposite end of said mending plate is secured to the top inside edge of the pickup truck cargo bed to mount the rails to the side of the vehicle.

6. An device according to claim 5, wherein adjustment is provided by the solid bar sliding in and out of the supporting rails to provide length adjustment for varying widths of pickup truck cargo beds.

\* \* \* \* \*